United States Patent Office 3,255,600
Patented June 14, 1966

3,255,600
PROCESS FOR PRODUCING CARBONATED ICE
William A. Mitchell, Lincoln Park, N.J., and Harry M. Barnes, Rockland County, and Henry G. Schwartzberg, Hartsdale, N.Y., assignors to General Foods Corporation, White Plains, N.Y., a corporation of Delaware
No Drawing. Continuation of application Ser. No. 96,707, Mar. 20, 1961. This application Sept. 28, 1964, Ser. No. 399,851
5 Claims. (Cl. 62—69)

This application is a continuation of application Serial No. 96,707, filed March 20, 1961, now abandoned.

This invention relates to a novel process for the formation of an ice product containing carbon dioxide therein, and particularly to such a process wherein liquid carbon dioxide and liquid water and admixed under controlled conditions to form the carbonated ice product.

A recent invention, described in a copending patent application, Serial No. 726,657, filed April 7, 1958, pertaining to the formation of such an ice having a very high carbon dioxide level, which apparently is entrapped in the ice crystals in compound form so that the resultant product is unexpectedly stable under normal refrigeration storage at temperatures of about −10° C. As described in the aforementioned application, prior art processes avoided the high carbon dioxide levels because of serious stability problems. This novel process includes subjecting an aqueous liquid to a carbon dioxide pressure of over 200 p.s.i.g. while maintaining the temperature during the reaction at the prevailing carbonated-ice-freezing temperature range. The present application is directed to the mixture of liquid water or water ice and liquid carbon dioxide to produce such a product. It has been discovered that the use of liquid carbon dioxide results in the more rapid formation of the carbon dioxide containing ice product while permitting more accurate control of the operating conditions.

The final ice product produced by the process disclosed herein has many uses; such as, for the carbonation of drinks by direct mixing of the carbonated ice with water, transportation and storage of gases by inclusion thereof in the carbonated ice product, for frozen confections which will generate a pleasing effervescent effect upon use, and the like.

It is an object of this invention, therefore, to produce a carbonated ice product in an improved manner by mixing water or ice and liquid carbon dioxide under defined pressure and temperature conditions.

In carrying out the process of the invention, the carbonated ice product will preferably be prepared by mixing water or ice and liquid carbon dioxide under the conditions described hereinbelow. Although there are some advantages in controlling the conditions of operation precisely by the use of distilled water, it is one feature of the process of the invention that ordinary tap water or commercial ice can be employed without any pretreatment. Appropriate amounts of color or flavoring as well as sugar and artificial sweeteners may be added to the water if desired. Such natural or artificial impurities may have a slight effect on the processing conditions but will not affect the resultant product materially. The terms water or ice, as hereinafter employed, are therefore intended to include water or ice with small amounts of natural or added impurities as well as water, per se.

The process of the invention can be conducted either continuously or batchwise. Under the preferred conditions, the water and liquid carbon dioxide are introduced into any suitable apparatus capable of withstanding the temperatures and pressures necessary for the proper formation of the carbonated product. The aforementioned copending patent application discloses that the carbon dioxide may be introduced in the gaseous, liquid or solid state; however, the process of the present invention is directed to the use of liquid carbon dioxide. Water and liquid carbon dioxide are introduced into the reaction vessel in controlled proportions so that with proper agitation the liquid carbon dioxide will be uniformly dispersed in the water. The rate of admixture and proportioning of the liquid streams can be more readily and accurately controlled by using liquid carbon dioxide since conventional fluid metering devices, such as controlled speed positive displacement pumps, can be readily utilized.

It is a feature of this invention that the heat removal necessary to produce a carbonated ice product can be accomplished by external cooling more readily than is the case when gaseous carbon dioxide is used. In the gaseous carbon dioxide contacting process, the carbonated ice initially forms as a slush during which time the heat transfer necessary for cooling can be aided by agitation. However, when as the slush becomes concentrated (40 to 50% solids or more), such agitation can no longer be carried out. Since the carbonated ice generally degasses almost immediately and completely in the presence of free liquid water at atmospheric pressure, the entire reaction product must be frozen to permit recovery of the carbonated ice product. This freezeup and the requisite heat removal is difficult to accomplish because of the difficulty encountered in mixing concentrated slushes. In the liquid carbon dioxide contacting process of this invention a similar slush is formed. However, since the carbonated ice product when discharged to the atmosphere in the presence of liquid carbon dioxide does not degas due to the tendency of the liquid carbon dioxide to evaporate, there is no need for a complete freezeup. Therefor, by using a predetermined excess of liquid carbon dioxide, the slush can be maintained sufficiently dilute in frozen solids content to permit agitation and mixing with unhampered heat removal.

A further advantage which accrues due to the ability to expose liquid carbon dioxide-carbonated ice mixtures to atmospheric pressure without degassing is the feasibility of using high pressure slurry pumps (such as the Moyno pump) to provide for continuous discharge of a product stream from the reaction system.

In another aspect of this invention, the heat removal problem is largely circumvented or minimized by charging the reactor with water ice and liquid carbon dioxide. The heat of melting of the water ice though slightly less than the heat of formation or solidification of the carbonated ice tends to provide most of the cooling required for the carbonated ice forming reaction.

It is a further feature of this invention that the necessary depressed reaction temperature can be attained with less, or in some cases with no, overt cooling than is required where gaseous carbon dioxide is used. This is accomplished by having an excess of liquid carbon dioxide in the reaction vessel and permitting a controlled isenthalpic expansion of the vapor in the head space above the mixture so that part of the carbon dioxide will vaporize, the heat of vaporization being sufficient to freeze the reaction product. The resultant product will be in the form of a snow of carbonated ice which can be readily compressed into suitable forms as desired. Thereafter, the evaporated carbon dioxide can be recompressed, cooled, liquefied and reused if desired. By utilizing this procedure the process can be carried out without special heat transfer devices while still achieving the necessary temperature conditions within the reaction vessel during the reaction period.

The liquid carbon dioxide reaction process of this invention can be performed with or without a vapor head space in the reaction vessel. Where such a vapor head space is not used, it is desirable to utilize a pneumatically loaded floating piston or accumulator to prevent the development of excessive hydrostatic pressure due to thermal and phase change induced expansion within the system. If a vapor head space is provided, the temperature and pressure of the system tend to assume values of approximately 11° C. and 655 p.s.i.g., respectively, under proper agitation conditions if the rate of heat removal is not excessively high. This tendency toward invariance in operating conditions greatly simplifies the control problem in the production of the carbonated ice described herein. When the last trace of free water is converted into carbonated ice, the system is no longer invariant and the temperature drops under the influence of the external or evaporation induced cooling, thereby providing a convenient indication that the reaction is complete. If extremely rapid rates of cooling are provided, such as may be attained by a rapid venting of carbon dioxide vapor from the reactor, the carbonated ice can be made to freeze out so rapidly that it does not have an opportunity to entrap the maximum possible amount of carbon dioxide. This effect may be used to produce carbonated ices of varying carbon dioxide contents. For example, carbonated ice can be formed during a period of slow controlled venting, then when a predetermined carbonation level is achieved, the residual liquid carbon dioxide can be vented very rapidly thereby freezing up the residual water without any substantial increase in the carbonation level.

When no vapor head space is provided, the pressure should be maintained at a value greater than the carbon dioxide vapor pressure at the temperature maintained in the reactor. In this situation, the desired reaction will generally occur at pressures greater than approximately 655 p.s.i.g. and temperatures higher than about 11° C., the upper temperature limit being the freezing point of the carbonated ice product. In certain cases, pressures as low as 200 p.s.i.g. may be used with satisfactory results, but the environment will be non-homogeneous with respect to temperature. The compound forming reaction temperature, as herein defined, will be referred to as the carbonated-ice-freezing range and will encompass the range from the freezing point of the uncarbonated water solution, 0° C. in the case of pure water, up to the freezing point of the carbonated ice product which may be as high as 14° C. or more. The desired reaction temperature may be produced either by overt cooling or by the controlled expansion and vaporization procedure outlined hereinabove. Where liquid carbon dioxide is used according to this invention to form the carbonated ice product, it was unexpectedly found that the time required to start the reaction was decreased and also that the temperature at which the reaction would start was higher.

Due to the particular temperature and pressure conditions of the process set forth herein and in the aforementioned copending application, carbon dioxide is contained in the product in an unexpected form, probably due to some type of compound formation, thus permitting higher carbon dioxide levels than were previously possible, on the order of from 25 milliliters to about 120 milliliters of carbon dioxide per gram of ice. This product with such a carbon dioxide content is surprisingly stable, even where the pressures utilized during the reaction are above the liquid-vapor equilibrium pressure of carbon dioxide at the operating temperature range. Pressures of from 200 p.s.i.g. to up to 1000 p.s.i.g. and above can be used if the final product produced is controlled so as to contain no more than 120 milliliters of carbon dioxide per gram of ice. As discussed hereinabove, the temperature maintained during the reaction may be varied anywhere from 0° C. upward to 14° C. or higher according to the specific pressure utilized and the desired carbon dioxide level in the final product.

It is a further feature of this invention that the uniformity of distribution of the carbon dioxide in the final product is enhanced by agitation during the reaction period. Such agitation serves to ensure proper mixing of the water or water ice and liquid carbon dioxide and also assists in preventing the buildup of solidified carbon dioxide on the walls of the reaction vessel which might result in a change in operating conditions for the non-solidified materials still being mixed in the vessel.

The carbonated ice prepared by the process outlined in this application resembles ordinary ice and may be cloudy or clear in appearance. The freezing point of this ice product is above 0° C. and may be as high as 14° C. or more, most commonly it is between about 4° C. to 8° C. The density of the product ice may be on the order of 0.94 g. per cc.–0.99 g. per cc. or higher, which is slightly heavier than ordinary ice having a density of about 0.92 g. per cc. The stability of the novel product of this invention is good below 0° C. Its initial stability is favorable in that any carbon dioxide which is not securely locked within the ice matrix may be readily liberated during a degassing period as described in the aforementioned copending application, where such degassing is necessary, without danger of explosion or product deterioration. The final stabilized product has a shelf life of at least 30 days, and usually substantially longer, so long as it is maintained under controlled conditions of temperature, i.e. under normal freezing conditions in a household freezer at about −10° C. Upon being added to water, a vigorous evolution of gas occurs with an average bubble size and quantity such as to give a carbonated beverage closely resembling "club soda." The carbonated beverage is ready for consumption in a short time, less than two minutes, and evolves from about 1.3 milliliters to 1.55 milliliters of carbon dioxide for 30 minutes or longer, thereby preventing the "flat" taste which rapidly occurs in most carbonated beverages when exposed to ambient conditions. The use of the product ice made according to the novel process defined herein results in the cooling of the liquid at a more rapid rate than is the case when normal ice is used.

Summarizing the product ice formation conditions, it is necessary that the pressure during mixing should be high enough to give an excess of liquid carbon dioxide in the presence of water, on the order of 200 p.s.i.g. and above, while the temperature maintained during the reaction should be as low as possible without permitting the formation of water ice during the reaction period, and 0° C. being the lower limit where pure water is used as the reactant liquid. This lower temperature limit may be somewhat different where the reactant liquid contains natural or added impurities. An important feature of the product gasified ice produced by the process described herein is the fact that the storage or existence conditions are much less stringent than the conditions for formation. Thus, the product is stable at normal pressures if stored at a temperature lower than the freezing point of the substance which was used to react with the carbon dioxide, i.e. 0° C. where pure water or pure water ice was used, thus resulting in stability over extended periods of time if stored at normal refrigeration temperatures of about −10° C.

According to a specific example of this invention, 5000 ml. of water at 4° C. and 12,000 ml. of liquid carbon dioxide at 24° C. were introduced into a five gallon autoclave which was closed and pressurized to 655 p.s.i.g. The two liquids were mixed under pressure using a conventional anchor blade agitator at a temperature of 11° C. for 30 minutes. The gas in the head space above the mixture was simultaneously allowed to expand (isenthalpically) through a throttling valve, thereby permitting some of the carbon dioxide to vaporize, the heat of vaporization serving to freeze out the product carbonated ice in the form of a snow. This snow was placed into water and a vigorous evolution of gas was observed wherein the average bubble size and quantity gave a resulting beverage which closely resembled the familiar "club soda" carbonated drink.

As an example of a modified form of the process of this invention, 900 gms. of water ice and 1500 gms. of liquid carbon dioxide at 24° C. were introduced into a five gallon autoclave which was closed and pressurized. The two substances were agitated and the carbon dioxide was vented producing a carbonated ice product in the form of a highly carbonated snow in thirty seconds.

In order to set forth the unusual features of the instant invention more clearly by contrasting it with unsatisfactory prior art techniques, a sample of ice (about 30 cc. volume) containing 5 milliliters of carbon dioxide per gram of ice and prepared by pressurizing water with 70 p.s.i.g. of carbon dioxide and then subjecting the carbonated mixture to freezing was dropped into 250 ml. of water. It was noted that the evolution of gas was barely noticeable and the carbonation of the liquid was extremely low. The bubbles which evolved were much too small in size and the quantity thereof was inadequate to effect proper carbonation. This product had a freezing point which was lower than that of water. The final mixture, upon tasting, did not give a true soda taste and it was found to be flat after a few minutes. In all respect the product prepared by carbonation at 70 p.s.i.g. was eminently inferior to the novel product of applicants' invention.

It will be apparent that other ways of freezing out the product ice after the passage of the appropriate reaction time under the specified temperature and pressure conditions may be used, and in fact it is possible using the process described herein to continuously produce carbonated ice having the requisite carbon dioxide content wherein liquid carbon dioxide and an aqueous medium are introduced in controlled proportions at one point, agitated and mixed for the necessary reaction time at the appropriate pressure and temperature conditions while being conveyed to another point where the carbonated ice product is taken off. As indicated herein the aqueous medium can be pure water ice or water ice containing small amounts of impurities as well as liquid water with or without small amounts of impurities.

The foregoing examples and discussion are used in a descriptive and not a limiting sense and various modifications and variations may be employed without departing from the substance of the herein defined invention or the intended scope of the appended claims.

What is claimed is:

1. The process of producing a carbonated ice product characterized by a carbon dioxide content of from 25 milliliters to 120 milliliters per gram of ice and long storage life which comprises introducing liquid carbon dioxide and water into a closed reaction vessel, mechanically agitating the two liquids to intimately mix the same, maintaining a vapor head space in said reaction vessel above the liquid level therein, venting said vapor head space at a controlled constant rate during the liquid reaction period to cause evaporation of a part of said liquid carbon dioxide thereby providing sufficient cooling to remove the heat of formation produced during the reaction, the rate of venting being controlled to maintain a temperature of approximately 11° C. and a pressure of approximately 655 p.s.i.g. for a time sufficient to permit completion of the reaction, and withdrawing carbonated ice after the temperature and pressure values decrease under said constant controlled venting conditions.

2. The process of producing a carbonated ice product characterized by a preselected carbon dioxide content and long storage life which comprises introducing liquid carbon dioxide and water into a closed reaction vessel, mechanically agitating the two liquids to intimately mix the same, maintaining a vapor head space in said reaction vessel above the liquid level therein, venting said vapor head space at a controlled constant rate during the liquid reaction period to cause evaporation of a part of said liquid carbon dioxide thereby providing sufficient cooling to remove the heat of formation produced during the reaction, the rate of venting being controlled to maintain a temperature of approximately 11° C. and a pressure of approximately 655 p.s.i.g. for a time sufficient to permit retention of said preselected amount of carbon dioxide by the water, rapidly venting said vapor head space to evaporate the remaining liquid carbon dioxide thereby freezing out the unreacted water, and withdrawing carbonated ice having said preselected carbon dioxide content.

3. The process of producing a carbonated ice product characterized by a high carbon dioxide content and long storage life which comprises mixing liquid carbon dioxide and ground water ice in a closed reaction vessel maintaining the headspace in said vessel at a pressure above 500 p.s.i.g., agitating said mixture, the temperature of said mixture rising from 0° C. to a maximum of approximately 11° C. and the pressure in the reaction vessel increasing to a maximum of approximately 655 p.s.i.g. during the course of the reaction period, continuing the reaction until the pressure and temperature values start to decrease, and withdrawing carbonated ice containing more than about 25 milliliters of carbon dioxide per gram of ice.

4. The process of producing a carbonated ice product characterized by a carbon dioxide content of from 25 milliliters to 120 milliliters per gram of ice and long storage life which comprises introducing liquid carbon dioxide and water into a closed reaction vessel, mechanically agitating the two liquids to intimately mix the same, maintaining a vapor head space in said reaction vessel above the liquid level therein, venting said vapor head space at a controlled constant rate during the liquid reaction period to cause evaporation of a part of said liquid carbon dioxide thereby providing sufficient cooling to remove the heat of formation produced during the reaction, the rate of venting being controlled to maintain a temperature not above 11° C. and a pressure below about 655 p.s.i.g. for a time sufficient to permit completion of the reaction, and withdrawing carbonated ice after the temperature and pressure values decrease under said constant controlled venting conditions.

5. The process of producing a carbonated ice product characterized by a preselected carbon dioxide content and long storage life which comprises introducing liquid carbon dioxide and water into a closed reaction vessel, mechanically agitating the two liquids to intimately mix the same, maintaining a vapor head space in said reaction vessel above the liquid level therein, venting said vapor head space at a controlled constant rate during the liquid reaction period to cause evaporation of a part of said liquid carbon dioxide thereby providing sufficient cooling to remove the heat of formation produced during the reaction, the rate of venting being controlled to maintain a temperature not above 11° C. and a pressure below about 655 p.s.i.g. for a time sufficient to permit retention of said preselected amount of carbon dioxide by the water, rapidly venting said vapor head space to evaporate the remaining liquid carbon dioxide thereby freezing out the unreacted water, and withdrawing carbonated ice having said preselected carbon dioxide content.

References Cited by the Examiner

UNITED STATES PATENTS

| | | | |
|---|---|---|---|
| 2,240,769 | 5/1941 | Glazer | 62—1 X |
| 2,575,509 | 11/1951 | Bayston | 62—69 X |
| 2,975,603 | 3/1961 | Barnes et al. | 62—69 X |

ROBERT A. O'LEARY, *Primary Examiner.*

W. E. WAYNER, *Assistant Examiner.*